(12) United States Patent
Spater

(10) Patent No.: US 11,639,090 B2
(45) Date of Patent: May 2, 2023

(54) CAR WINDOW AND DOOR GUARD

(71) Applicant: Radio Systems Corporation, Knoxville, TN (US)

(72) Inventor: Christopher Spater, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 24 days.

(21) Appl. No.: 17/342,039

(22) Filed: Jun. 8, 2021

(65) Prior Publication Data

US 2021/0380049 A1    Dec. 9, 2021

Related U.S. Application Data

(60) Provisional application No. 63/036,747, filed on Jun. 9, 2020.

(51) Int. Cl.
*B60J 11/08* (2006.01)
*B60J 1/20* (2006.01)
(Continued)

(52) U.S. Cl.
CPC ............. *B60J 11/08* (2013.01); *B60J 1/2094* (2013.01); *B60R 7/046* (2013.01); *B60R 13/043* (2013.01)

(58) Field of Classification Search
CPC ........ B60J 11/08; B60J 5/0493; B60J 1/2094; B60J 1/20; B60R 7/046; B60R 21/06; B60R 13/0206; B60R 13/0243
(Continued)

(56) References Cited

U.S. PATENT DOCUMENTS 3,749,147 A * 7/1973 Hess ...................... B60J 1/2011
160/354
3,855,898 A * 12/1974 McDonald .............. B60R 21/12
296/146.7
(Continued)

FOREIGN PATENT DOCUMENTS

DE        202021102581 U1 * 7/2021 ............ A01M 29/34

OTHER PUBLICATIONS

K&H Pet Products Vehicle Door Protector, amazon.com, https://www.amazon.com/gp/product/B00YGZ95PG/, May 1, 2015 (Year: 2015).*
(Continued)

*Primary Examiner* — Jason S Morrow
*Assistant Examiner* — Wenwei Zhuo
(74) *Attorney, Agent, or Firm* — Baker Donelson Bearman Caldwell & Berkowitz, PC

(57) ABSTRACT

A car window and door guard has an upper or window portion configured to be mounted over the window frame surrounding the window of a car door, and a lower or door portion or cover configured to be lie over the door panel. The window portion has a front panel and a rear panel to form a sleeve. The window portion is generally see-through or transparent. The door includes an upper strip or section and a series of window tabs. Each window tab has a generally flat or planar portion extending from an elongated upper channel portion. The channel portion captures the door window slot or surround to prevent the window tab from being moved upward during the raising of the window. The door portion also has a lower section extending downwardly from the upper section that drapes over the car's door panel to protect the door panel.

17 Claims, 6 Drawing Sheets

(51) Int. Cl.
*B60R 7/04* (2006.01)
*B60R 13/04* (2006.01)

(58) Field of Classification Search
USPC ........... 296/152, 201, 136.07, 153; 160/105; 280/749
See application file for complete search history.

(56) References Cited

U.S. PATENT DOCUMENTS

| | | | | |
|---|---|---|---|---|
| 5,524,694 A * | 6/1996 | Arapis | ................... | B60J 1/2011 160/354 |
| 5,679,918 A * | 10/1997 | Korpi | ................... | F41H 5/263 89/36.02 |
| 5,857,730 A * | 1/1999 | Korpi | ................... | F41H 5/226 89/36.09 |
| 6,063,477 A * | 5/2000 | Ames | ................... | B60J 1/025 428/192 |
| 6,352,299 B1 * | 3/2002 | Ames | ................... | B60J 1/025 297/219.1 |
| 6,367,536 B1 * | 4/2002 | St Louis | ................ | E06B 9/521 160/90 |
| 6,869,127 B2 * | 3/2005 | Dohle | ................... | B60J 1/08 160/90 |
| 2005/0242608 A1 * | 11/2005 | Vance | ................... | B60R 13/02 296/39.1 |
| 2019/0016275 A1 * | 1/2019 | May | ................... | A01K 1/0272 |

OTHER PUBLICATIONS

K&H Vehicle Door Protector, https://youtu.be/oH9obXkcGaY, Dec. 11, 2015 (Year: 2015).*
Kurgo, Car Door Guard, https://www.kurgo.com/car-seat-covers/car-door-guard (Year: 2021).*

* cited by examiner

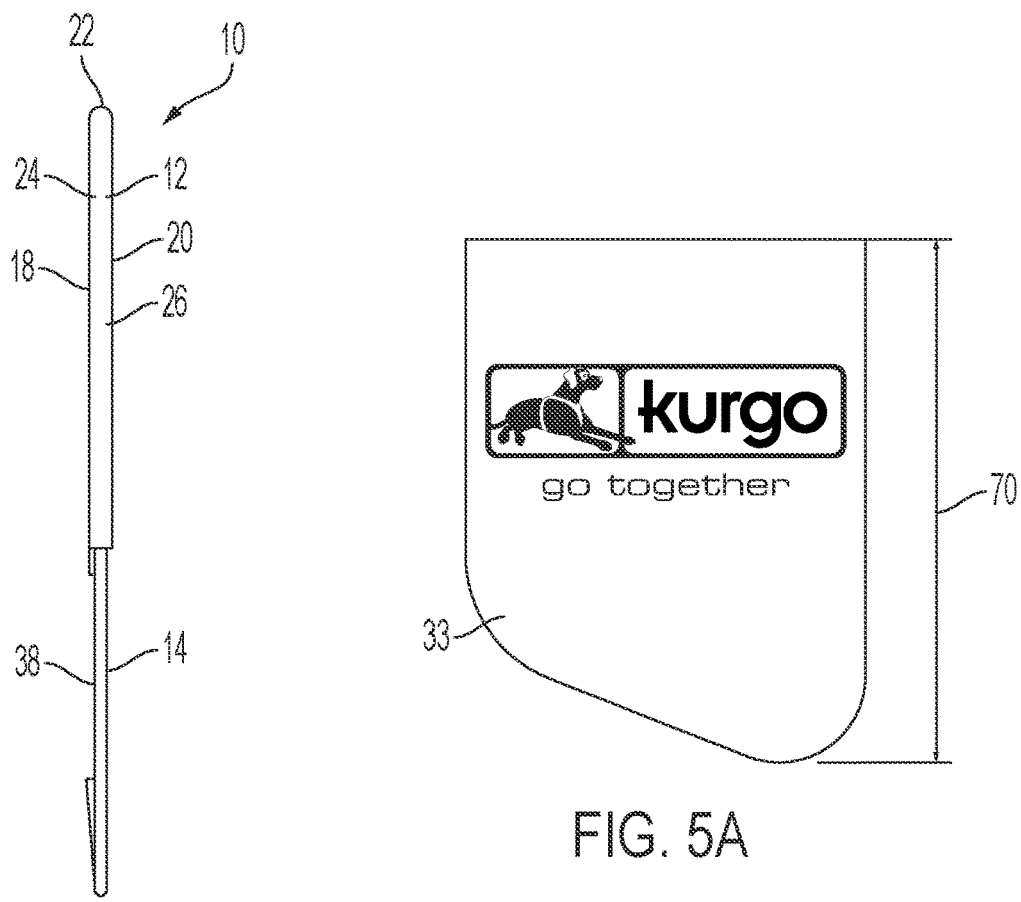
FIG. 4
FIG. 5A
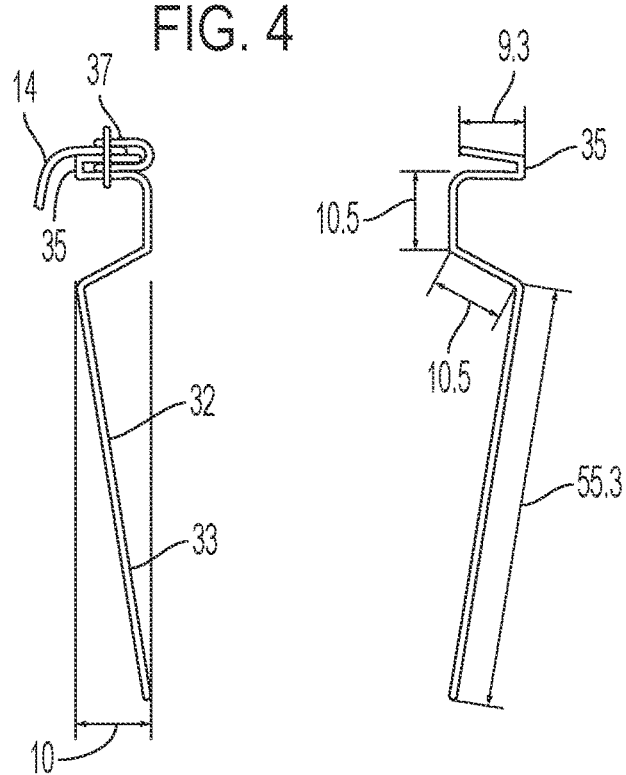
FIG. 5B  FIG. 5C
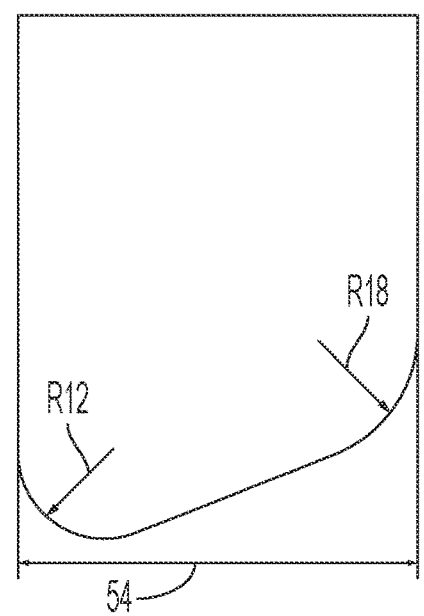
FIG. 5D

CAR WINDOW AND DOOR GUARD

CROSS REFERENCE TO RELATED APPLICATIONS

This application claims the benefit of U.S. Provisional Patent Application No. 63/036,747 filed Jun. 9, 2020 and is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of car window and door guards. More particularly, the invention relates to a car window and door guard which is designed to allow the window to be opened while preventing the passage of arms and heads through the open window.

Technology in the Field of the Invention

People and their pets traveling in cars oftentimes open the windows to allow fresh air to enter the car. However, a problem with riding with the window down is that children often like to extend their arms out the window. This problem is also prevalent with dogs which enjoy extending their heads out the window. Obviously, extending an arm or head out of the window of a moving car may cause great injury, or even death, if the arm or head is stuck by an object outside of the car.

People also open the window when parked for a short time to prevent the overheating of an animal inside the car. A problem with this is that the animal may try to jump out of the car through the open window. Another problem is that the animal may cause damage to the car door as the animal's claws may scratch the door sill, armrest, or door panel as the animal tries to access the open window.

Accordingly, a need exists for a device that allows the unencumbered opening and closing of a car window while also preventing the limbs or heads of children and/or animals from being extended through the open window. It is to the provision of such therefore that the present invention is primarily directed.

BRIEF SUMMARY OF THE INVENTION

A car window and door guard comprises an upper portion forming a pocket sized and shaped to receive a window portion of a car door, the upper portion being made of a transparent material, and a lower portion extending from the upper portion, the lower portion forming a shield sized and shaped to overlay an interior door portion of a car door.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 4 is a side view of the car window and door guard of FIG. 1.

FIG. 5A is a front view of a window tab of the car window and door guard of FIG. 1.

FIG. 5B is a side view of the window tab of the car window and door guard of FIG. 1.

FIG. 5C is a side view of the window tab of the car window and door guard of FIG. 1.

FIG. 5D is a rear view of the window tab of the car window and door guard of FIG. 1.

DETAILED DESCRIPTION OF CERTAIN EMBODIMENTS

Definitions

Figure 1:
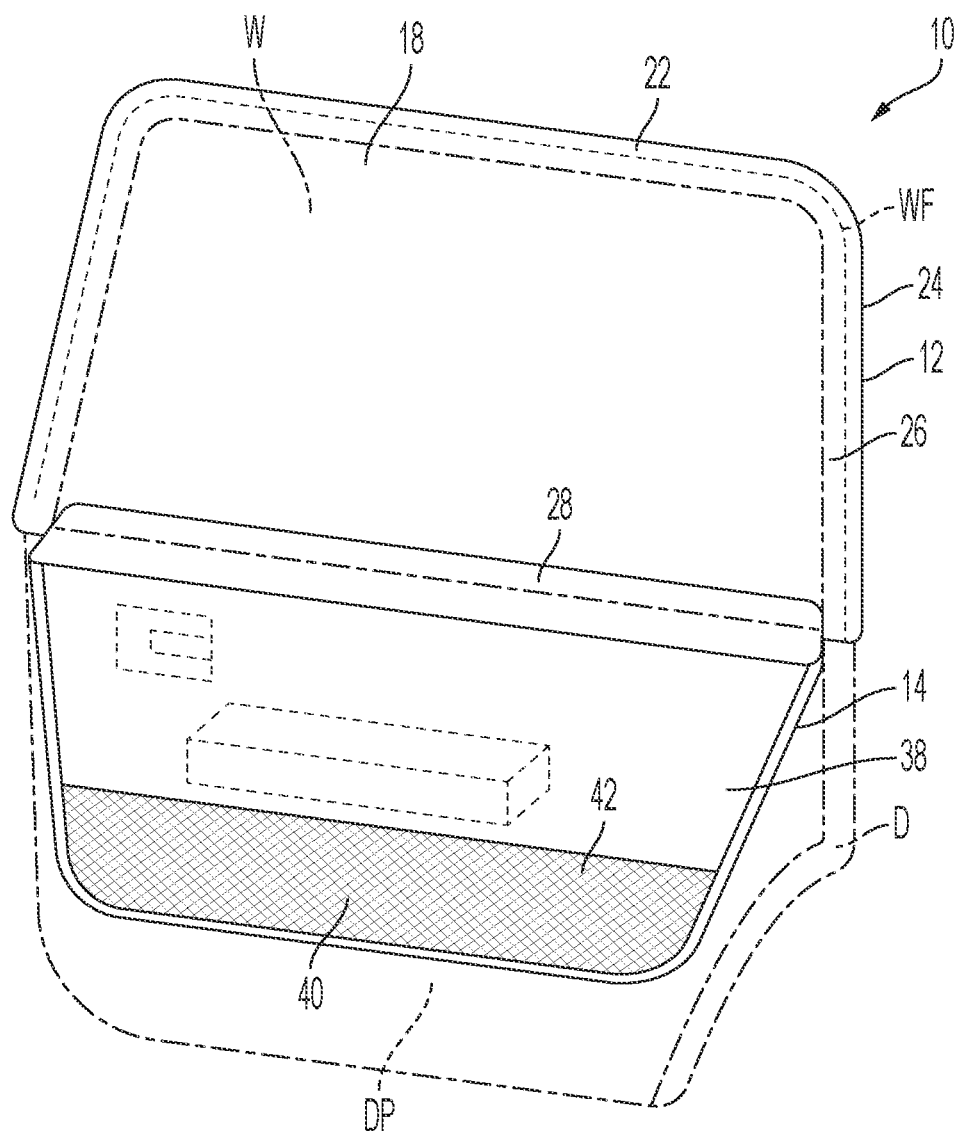
FIG. 1 is a perspective view of a car window and door guard shown mounted to a car door.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

DESCRIPTION OF SELECTED SPECIFIC EMBODIMENTS

With reference next to the drawings, there is a shown a car window and door guard 10 in a preferred form of the present invention, referenced herein as guard 10. The guard 10 has an upper or window portion 12, configured to be mounted over the window frame WF surrounding the glass window W of a car door D, and a lower or door portion or cover 14, configured to be lie over the door's interior side or door panel DP below the window.

The window portion 12 has a front panel 18 and a rear panel 20. The front panel 18 and rear panel 20 are joined together along their upper edge 22 and oppositely disposed side edges 24 to form a sleeve, pocket or pouch 26. The front panel 18 and rear panel 20 are made of a two-way or four-way stretchable material, such as a polyether-polyurea copolymer. The stretchable material has interstices which are sized so that the material is also generally see-through or transparent. The term transparent is meant to denote a material which allows a person to see through the material in order to view objects on the opposite side of the material, such as a clear plastic sheet, netting, perforated materials, or a knit or mesh material with interstices that allow such viewing.

The door portion 14 extends from the bottom edge of the window portion 12. The door portion 14 is made of a fabric, leather, synthetic material, or the like, and includes an upper strip or section 28 that joins the window portion 12 and the door portion 14. The upper section 28 includes a rubber strip 30 which aids in protecting the door sill or upper edge through which the window glass extends. The upper section 28 also has a series of window tabs or anchors 32 that pivot about the upper edge 28. The upper section 28 also includes one or more pre-stretched horizontal elastic areas 36 that are created by sewing the window portion 12 to the door portion 14 in a stretched condition so that the elastic nature of the window portion 12 pulls the door portion 14 together when released. The laterally extending pre-stretchable areas 36 create a contraction force upon the lower portion 14.

As seen in FIGS. 5A-5F, each window tab 32 has a generally flat or planar portion 33 extending from an elongated generally C-shaped upper channel portion 34. The channel portion 34 captures the door window slot or surround to prevent the window tab 32 from being moved upward during the raising of the window. The channel portion 34 includes a mounting or sewing flange 35 which is sewn to the upper margin or edge tape portion 37 of the door portion 14.

The door portion 14 also has a lower section 38 extending downwardly from the upper section 28. The lower section 38 drapes over the car's door panel DP to protect the door panel DP, such as the door armrest, panel, etc. The bottom margin or area of the lower section 38 may include a mesh or solid layer 40 that is joined along the bottom edge and two side edges to form a cargo area or pocket 42.

In use, the window portion 12 is stretched over the window frame WF of a car's open door D, as shown in FIG. 1. The stretching capabilities of the window portion 12 enable a tight fit upon the window frame WF, which also allows the door D to be shut without interference by the guard 10 as the window portion 12 is stretched tight between the door D and the surrounding door frame of the car. The pre-stretched elastic areas 36 of the upper section 28 also provide a contraction force to ensure a tight fit of the guard 10 upon the door D. With the window portion 12 fitted in this manner, the window portion 12 is stretched so that a person may easily see through the window portion 12, so that the driver's view is not impeded. As the window portion 12 is stretched tight, the front and rear panels 18 and 20 do not extend into the window's W line of travel, and thus, the window W or window glass may be raised and lowered without interfering with the guard 10.

The window tabs 32 are then positioned between the window glass and the car door window slot to maintain the general position of the door portion 14 during use. The planar portion 33 of the window tabs abut and slide upon the window during window movement. The channel portion 34 of each tab 32 captures a portion of the window slot, surround, sill or door structure defining the window opening in the door to prevent the window tabs 32 from moving with the raising or lowering of the window. The door portion 14 simply drapes down over the door below the window, i.e., the door portion 14 overlays the interior door panel DP to protect it from scratches or other damage by animal contact.

With the guard 10 in position, the transparent nature of the upper portion 12 allows the driver of the car to easily see through the guard window portion 12. The operation of the window W is not hampered by the door guard 10, as the door guard 10 does not generally enter the area of the window opening. Also, the guard 10 does not hamper the door itself, as the material is of such a thin material that it easily fits between the car door and the door jamb without interfering with such.

Figure 5E:
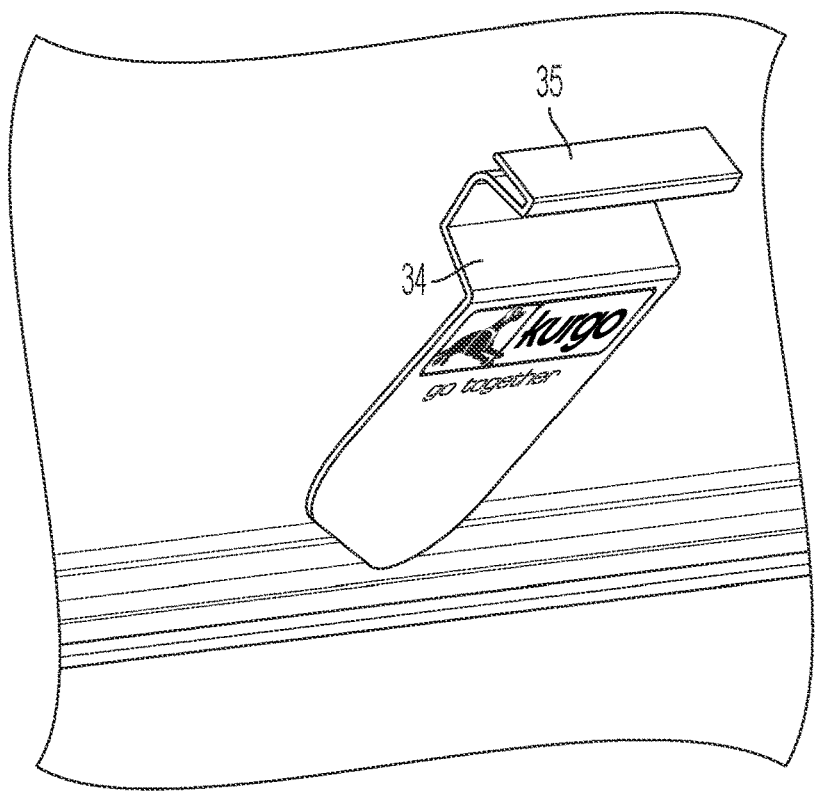
FIG. 5E is a perspective view of the window tab of the car window and door guard of FIG. 1, shown prior to mounting.
Figure 5F:
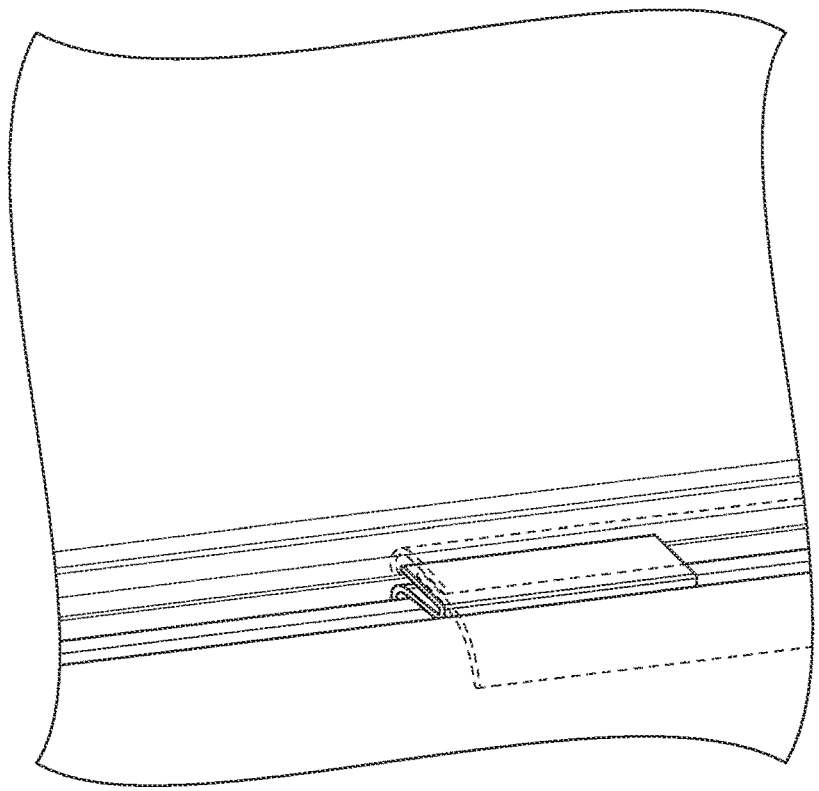
FIG. 5F is a perspective view of the window tab of the car window and door guard of FIG. 1, shown in a mounted position with a portion of an edge tape portion and door portion shown in phantom lines.
Figure 5G:
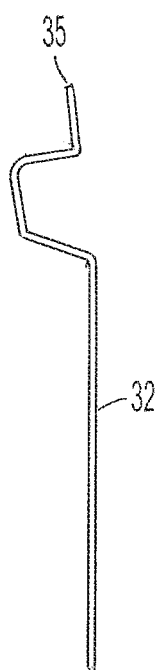
FIG. 5G is a side view of the window tab of the car window and door guard of FIG. 1 in another preferred form.

As seen in FIG. 5G, there is shown a window tab 32 in another embodiment. Here, each window tab 32 has a generally flat or planar portion 33 extending from an elongated upper channel portion 34. The channel portion 34 captures the door window slot or surround to prevent the window tab 32 from being moved upward during the raising of the window. The channel portion 34 includes a mounting or sewing flange 35 that is sewn to the upper margin or edge tape portion 37 of the door portion 14. The sewing flange 35 is oriented vertically, rather than horizontally as shown in the previous embodiment.

It should be understood that the rear panel 20 need not extend down the entire height of the window, as a portion large enough to form a pouch and capture the window area is all that is required to maintain the window portion 12 in place.

Figure 2:
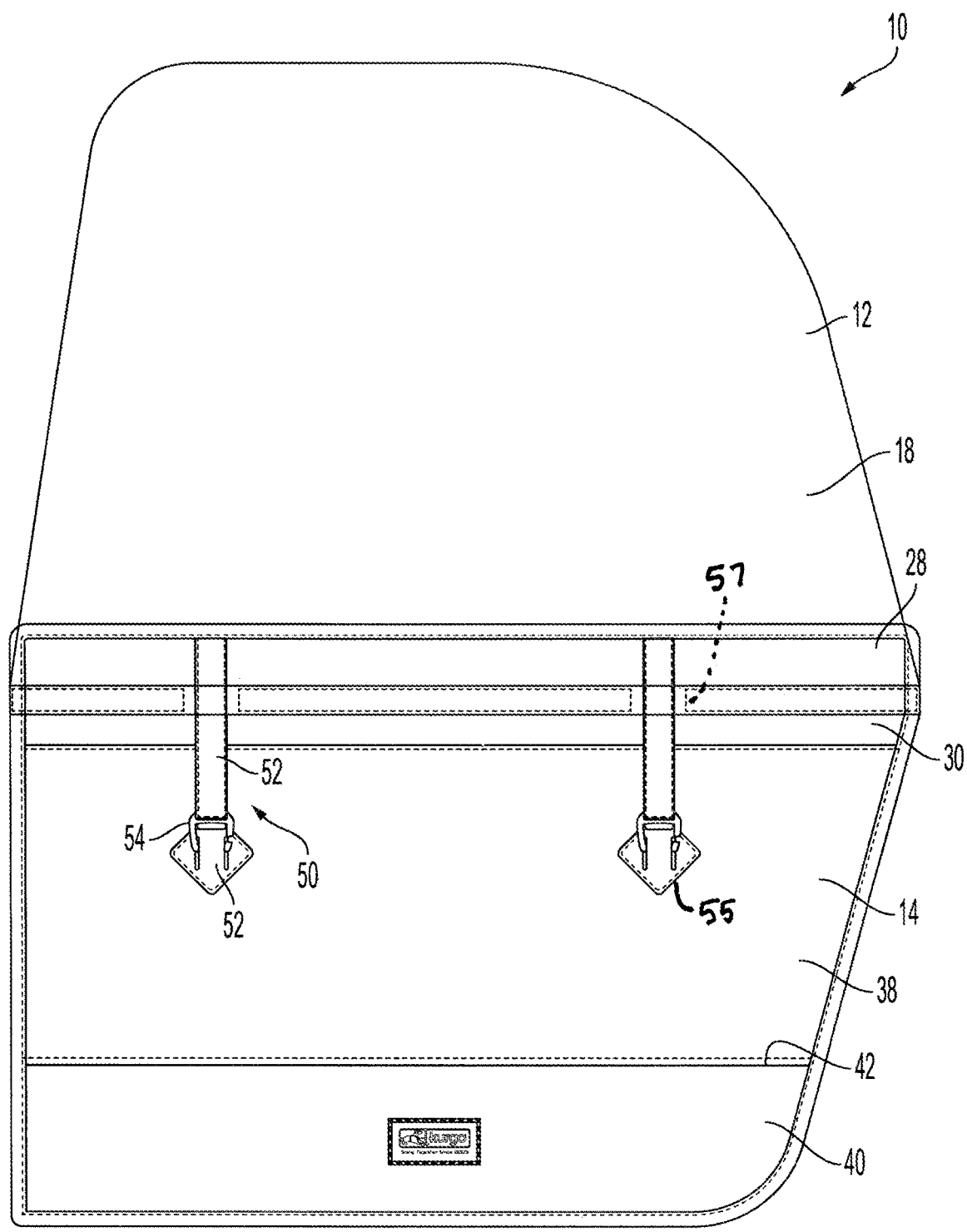
FIG. 2 is a front view of the car window and door guard of FIG. 1.
Figure 3:
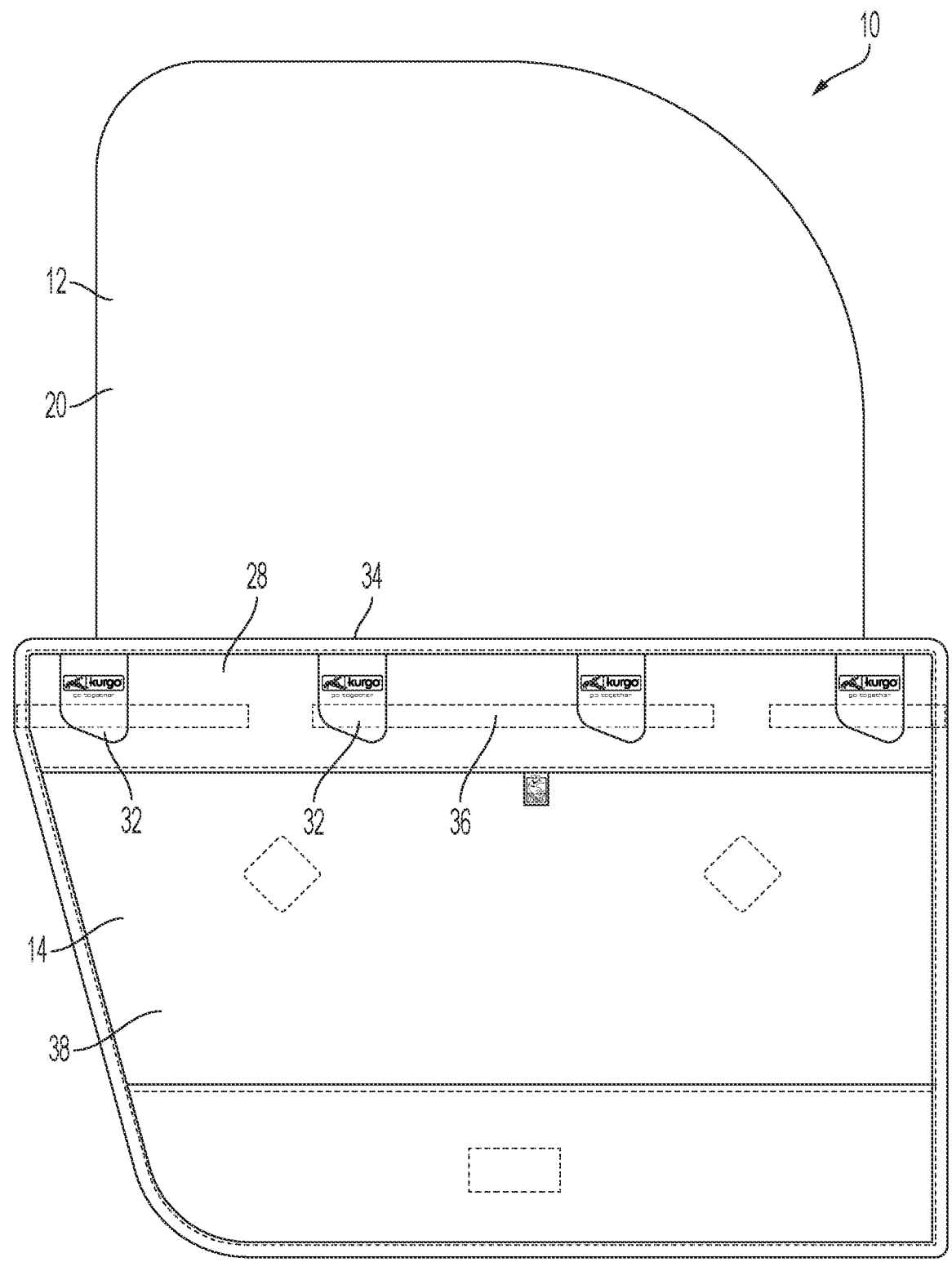
FIG. 3 is a rear view of the car window and door guard of FIG. 1.

With reference next to FIG. 2, the window guard 10 is shown with a pair of optional adjustment straps 50. Each adjustment strap includes a two-piece strip 52 of flexible material coupled to a top edge and mid-portion of the door portion 14 and a buckle 54 coupled to the two-piece strips 52. The buckle 54 is releasably coupled to a slotted patch 55. The buckle 54 may be released from the slotted patch 55 so that the window portion 12 may be rolled-up or gathered and the strips 52 placed over the gathered window portion and resecured to the slotted patch 55 in order to maintain the rolled window portion 12 in this rolled condition and position, so as to enable one to remove and stow the window portion 12 from the window frame WF if desired. The strips 52 pass through a non-sewn portion or slot 57 in the elastic areas 36 so that the strips 52 may be passed through the slots 57 and over the rolled window portion 12.

It should be understood that the guard 10 may be manufactured in a variety of sizes and shapes. The guard 10 shown in the preferred embodiment has a window portion 12 having a general height of 456 mm and width of 625 mm. The door portion 14 has a general height of 492 mm and width of 625 mm. The height of the door portion upper section 28 is approximately 100 mm. The height of the door portion lower section 38 is approximately 175 mm. The measurements show in FIGS. 5A, 5C and 5D are illustrated in millimeters.

It should be understood that the guard 10 may also be constructed with only a window portion 12 to prevent access through the window opening without the additional door portion 14 to protect the door panel.

A door guard is described herein comprising under an embodiment a flexible door cover having an upper section and a lower section, and at least one window anchor coupled to the upper section of the flexible door cover, the at least one window anchor having a channel portion sized and shaped to receive a window slot portion of a car door, and a planar portion extending from the channel portion.

The at least one window anchor of an embodiment also has a mounting flange extending from the channel portion, whereby the mounting flange is mounted to the flexible door cover.

A door guard further comprises a window portion extending from the flexible door cover, under an embodiment.

The window portion of an embodiment has a pocket sized and shaped to receive a car window portion of a car door.

The window portion of an embodiment is made of a transparent, stretchable material.

A door guard for use with a car having a door with a window slot adjacent a window glass is described herein under an embodiment, the door guard comprising a door cover overlaying an interior door portion of a car door, and a plurality of window tabs coupled to an upper section of the door cover, each window tab being sized and shaped to be positioned between the window glass and the window slot surrounding the window glass.

Each window tab has an elongated C-shaped channel sized and shaped to capture the window slot within the elongated C-shaped channel, under an embodiment.

Each window tab also has a planar portion extending downwardly from the elongated C-shaped channel, under an embodiment.

Each window tab also has a mounting flange extending from the elongated C-shaped channel, whereby the mounting flange is mounted to the door cover, under an embodiment.

A window portion of an embodiment extends from the door cover

The window portion of an embodiment has a pocket sized and shaped to receive a car window portion of the car door.

The window portion of an embodiment is made of a transparent, stretchable material.

A window guard for use with a car having a door with a window slot surrounding a window frame is described herein under an embodiment, the door guard comprising a window portion mountable to a window frame of a car door, and at least one window tab coupled to a lower section of the window portion, the window tab being sized and shaped to be positioned between the window glass and the window slot surrounding the window glass.

The window tab of an embodiment has an elongated C-shaped channel sized and shaped to capture the window slot within the elongated C-shaped channel.

The window tab of an embodiment also has a planar portion extending downwardly from the elongated C-shaped channel.

The window tab of an embodiment has a mounting flange extending from the elongated C-shaped channel, whereby the mounting flange is mounted to the window portion.

The window guard of an embodiment comprises a door portion extending from the window portion.

The window portion of an embodiment has a pocket sized and shaped to receive the window frame of the car door.

The window portion of an embodiment is made of a transparent, stretchable material.

It will be appreciated that the inventions are susceptible to modification, variation and change without departing from the spirit thereof.

The invention claimed is:

1. A door guard comprising:
    a flexible door cover having an upper section and a lower section, and
    at least one window anchor coupled to the upper section of the flexible door cover, the at least one window anchor having a C-shaped channel portion sized and shaped to receive a window slot portion of a car door, the C-shaped channel facing away from a window glass within the car door, and a planar portion extending from the channel portion.

2. The door guard of claim 1 wherein the at least one window anchor also has a mounting flange extending from the C-shaped channel portion,
    whereby the mounting flange is mounted to the flexible door cover.

3. The door guard of claim 1 further comprising a window portion extending from the flexible door cover.

4. The door guard of claim 3 wherein the window portion has a pocket sized and shaped to receive a car window portion of a car door.

5. The door guard of claim 4 wherein the window portion is made of a transparent, stretchable material.

6. A door guard for use with a car having a door with a window slot adjacent a window glass, the door guard comprising:
    a door cover overlaying an interior door portion of a car door, and
    a plurality of window tabs coupled to an upper section of the door cover, each window tab being sized and shaped to be positioned between the window glass and the window slot surrounding the window glass, each window tab having a C-shaped channel configured to receive the window slot of the door.

7. The door guard of claim 6 wherein each window tab also has a planar portion extending downwardly from the elongated C-shaped channel.

8. The door guard of claim 6 wherein each window tab also has a mounting flange extending from the elongated C-shaped channel,
    whereby the mounting flange is mounted to the door cover.

9. The door guard of claim 6 further comprising a window portion extending from the door cover.

10. The door guard of claim 9 wherein the window portion has a pocket sized and shaped to receive a car window portion of the car door.

11. The door guard of claim 10 wherein the window portion is made of a transparent, stretchable material.

12. A window guard for use with a car having a door with a window slot surrounding a window frame, the window guard comprising:
    a window portion mountable to the window frame of the car door, and
    at least one window tab coupled to a lower section of the window portion, the window tab being sized and shaped to be positioned between the window glass and the window slot surrounding the window glass, the at least one window tab having an elongated C-shaped channel configured to receive the window slot of the door.

13. The window guard of claim 12 wherein the window tab also has a planar portion extending downwardly from the elongated C-shaped channel.

14. The window guard of claim 12 wherein the window tab has a mounting flange extending from the elongated C-shaped channel, whereby the mounting flange is mounted to the window portion.

15. The window guard of claim 12 further comprising a door portion extending from the window portion.

16. The window guard of claim 12 wherein the window portion has a pocket sized and shaped to receive the window frame of the car door.

17. The window guard of claim 12 wherein the window portion is made of a transparent, stretchable material.

* * * * *